(12) United States Patent
Reuter et al.

(10) Patent No.: US 7,497,528 B2
(45) Date of Patent: Mar. 3, 2009

(54) BRAKE-BY-WIRE BRAKING SYSTEM WITH HYDRAULIC FAIL-SAFE

(75) Inventors: David F. Reuter, Beavercreek, OH (US); Richard J Kriz, II, Fort Wayne, IN (US); Schuyler Scott Shaw, Tipp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 122 days.

(21) Appl. No.: 11/650,839

(22) Filed: Jan. 8, 2007

(65) Prior Publication Data

US 2007/0188018 A1    Aug. 16, 2007

Related U.S. Application Data

(60) Provisional application No. 60/773,003, filed on Feb. 14, 2006.

(51) Int. Cl.
*B60T 8/60* (2006.01)
(52) U.S. Cl. .............. 303/115.2; 303/113.4; 303/155
(58) Field of Classification Search ......... 188/158–164; 303/113.1, 114.1, 115.2
See application file for complete search history.

(56) References Cited

U.S. PATENT DOCUMENTS

| 5,312,172 | A * | 5/1994 | Takeuchi ................. 303/113.1 |
|---|---|---|---|
| 6,305,758 | B1 * | 10/2001 | Hageman et al. ......... 303/115.2 |
| 6,357,835 | B1 * | 3/2002 | Boisseau ................. 303/113.5 |
| 6,533,369 | B2 * | 3/2003 | Baumgartner et al. ....... 303/155 |
| 6,598,943 | B2 * | 7/2003 | Harris ..................... 303/113.4 |
| 2002/0108822 | A1 * | 8/2002 | Klode ........................ 188/161 |
| 2003/0080612 | A1 * | 5/2003 | Riddiford ................ 303/115.2 |
| 2004/0135432 | A1 * | 7/2004 | Reuter et al. ................ 303/152 |
| 2004/0195058 | A1 * | 10/2004 | Ina et al. ...................... 188/158 |
| 2005/0275286 | A1 * | 12/2005 | Ohmori et al. .............. 303/155 |
| 2006/0091726 | A1 * | 5/2006 | Hatano et al. .......... 303/122.13 |

FOREIGN PATENT DOCUMENTS

| DE | 19533174 | 3/1997 |
|---|---|---|
| DE | 102005048716 | 6/2006 |

* cited by examiner

*Primary Examiner*—Christopher P Schwartz
(74) *Attorney, Agent, or Firm*—Thomas N. Twomey

(57) ABSTRACT

A brake-by-wire braking system including a braking unit, an electro-hydraulic actuator in fluid communication with the braking unit by way of a first fluid path, a master cylinder in fluid communication with the braking unit by way of a second fluid path, a normally open solenoid valve operatively associated with the second fluid path, and a control unit adapted to actuate the normally open solenoid valve, wherein actuation of the normally open solenoid valve generally fluidly isolates the master cylinder from the braking unit.

9 Claims, 6 Drawing Sheets

BRAKE-BY-WIRE BRAKING SYSTEM WITH HYDRAULIC FAIL-SAFE

This application claims priority from U.S. Provisional Ser. No. 60/773,003 filed on Feb. 14, 2006, the entire contents of which are incorporated herein by reference.

BACKGROUND

The present application is directed to brake-by-wire braking systems and, more particularly, to full brake-by-wire braking systems with a hydraulic fail-safe.

Modern vehicles, including electric vehicles, hybrid vehicles and traditional petroleum-powered vehicles, may include numerous electrical and computerized systems, such as brake-by-wire braking systems. Brake-by-wire braking systems typically replace the traditional mechanical and hydraulic fluid connection between the brake pedal and the braking units (e.g., disk or drum brakes) with an electrical connection (i.e., brake-by-wire). The electrical connection typically communicates user input signals from the brake pedal to a control unit and the control unit in turn controls the operation of the brake units to apply or release a braking force.

A disadvantage associated with brake-by-wire braking systems is the risk that a single failure loss of electrical power will disable the brake system, leaving the vehicle operator with no means for stopping and/or controlling the vehicle. Attempts have been made to reduce the risks associated with an electrical failure by providing redundant or multiple independent electrical systems complete with separate battery reserves to serve as back-up systems in the event of an electrical system failure. However, such redundant electrical systems substantially increase manufacturing and system costs and typically increase the overall complexity of the electrical system.

Accordingly, there is a need for a brake-by-wire braking system having a hydraulic fail-safe feature that can reduce manufacturing and system costs and electrical system complexity, as well as provide a simple, robust and proven source of braking energy in the event of electrical system malfunction.

SUMMARY

In one aspect, the disclosed brake-by-wire braking system may include a braking unit, an electro-hydraulic actuator in fluid communication with the braking unit by way of a first fluid path, a master cylinder in fluid communication with the braking unit by way of a second fluid path, a normally open solenoid valve operatively associated with the second fluid path, and a control unit adapted to actuate the normally open solenoid valve, wherein actuation of the normally open solenoid valve generally fluidly isolates the master cylinder from the braking unit.

In another aspect, the disclosed brake-by-wire braking system may include a control unit, an electro-mechanical brake caliper associated with a first vehicle wheel, the electro-mechanical brake caliper being in communication with and actuateable by the control unit, a hydraulically actuated braking unit associated with a second vehicle wheel, an electro-hydraulic actuator in fluid communication with the hydraulically actuated braking unit by way of a first fluid path, the electro-hydraulic actuator being in communication with and actuateable by the control unit, a master cylinder in fluid communication with the hydraulically actuated braking unit by way of a second fluid path, and a normally open solenoid valve operatively associated with the second fluid path, the normally open solenoid valve being in communication with and actuateable by the control unit, wherein, when the electro-hydraulic actuator is actuated, the normally open solenoid valve is actuated.

Other aspects of the disclosed braking system will become apparent from the following description, the accompanying drawings and the appended claims.

DETAILED DESCRIPTION

Figure 1:
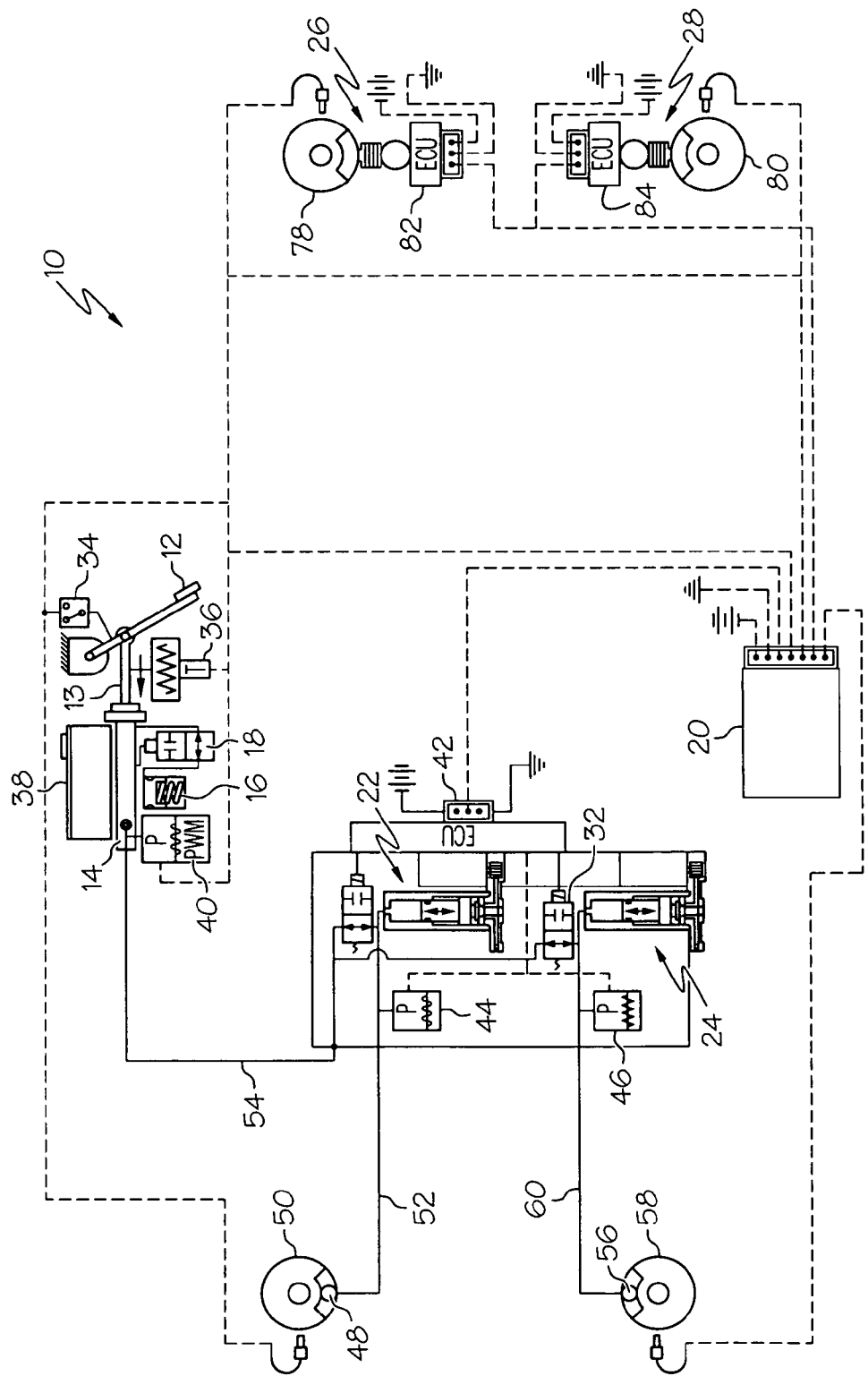
FIG. 1 is a schematic view of one aspect of the disclosed brake-by-wire braking system having a hydraulic fail-safe.

As shown in FIG. 1, a first aspect of a brake-by-wire braking system having a hydraulic fail-safe, generally designated 10, may include a brake pedal 12, a master cylinder 14, a pedal feel emulator 16, a hydraulically actuated bypass valve 18, a main control unit 20, a first electro-hydraulic actuator 22, a second electro-hydraulic actuator 24, a first electro-mechanical brake caliper 26, a second electro-mechanical brake caliper 28, a first normally open solenoid valve 30 and a second normally open solenoid valve 32. Additionally, the system 10 may include a brake pedal switch 34, a pedal travel sensor 36, a hydraulic fluid reservoir 38, a master cylinder pressure sensor 40, a front axle control unit 42, a first wheel pressure sensor 44 and a second wheel pressure sensor 46.

As shown in FIG. 1, the first electro-hydraulic actuator 22 may be in communication with a brake caliper 48 associated with the right front wheel 50 of a vehicle (not shown) by way of fluid line 52. Fluid line 52 may be in fluid communication with the master cylinder 14 by way of fluid line 54 and the first normally open solenoid valve 30. Pressure sensor 44 may be positioned on fluid line 52 to monitor the hydraulic fluid pressure and communicate the pressure to the front axle control unit 42 and ultimately to the master control unit 20.

As shown in FIG. 1, the second electro-hydraulic actuator 24 may be in communication with a brake caliper 56 associated with the left front wheel 58 of the vehicle by way of fluid line 60. Fluid line 60 may be in fluid communication with the master cylinder 14 by way of fluid line 54 and the second normally open solenoid valve 32. Pressure sensor 46 may be positioned on fluid line 60 to monitor the hydraulic fluid pressure and communicate the pressure to the front axle control unit 42 and ultimately to the master control unit 20.

Figure 2:
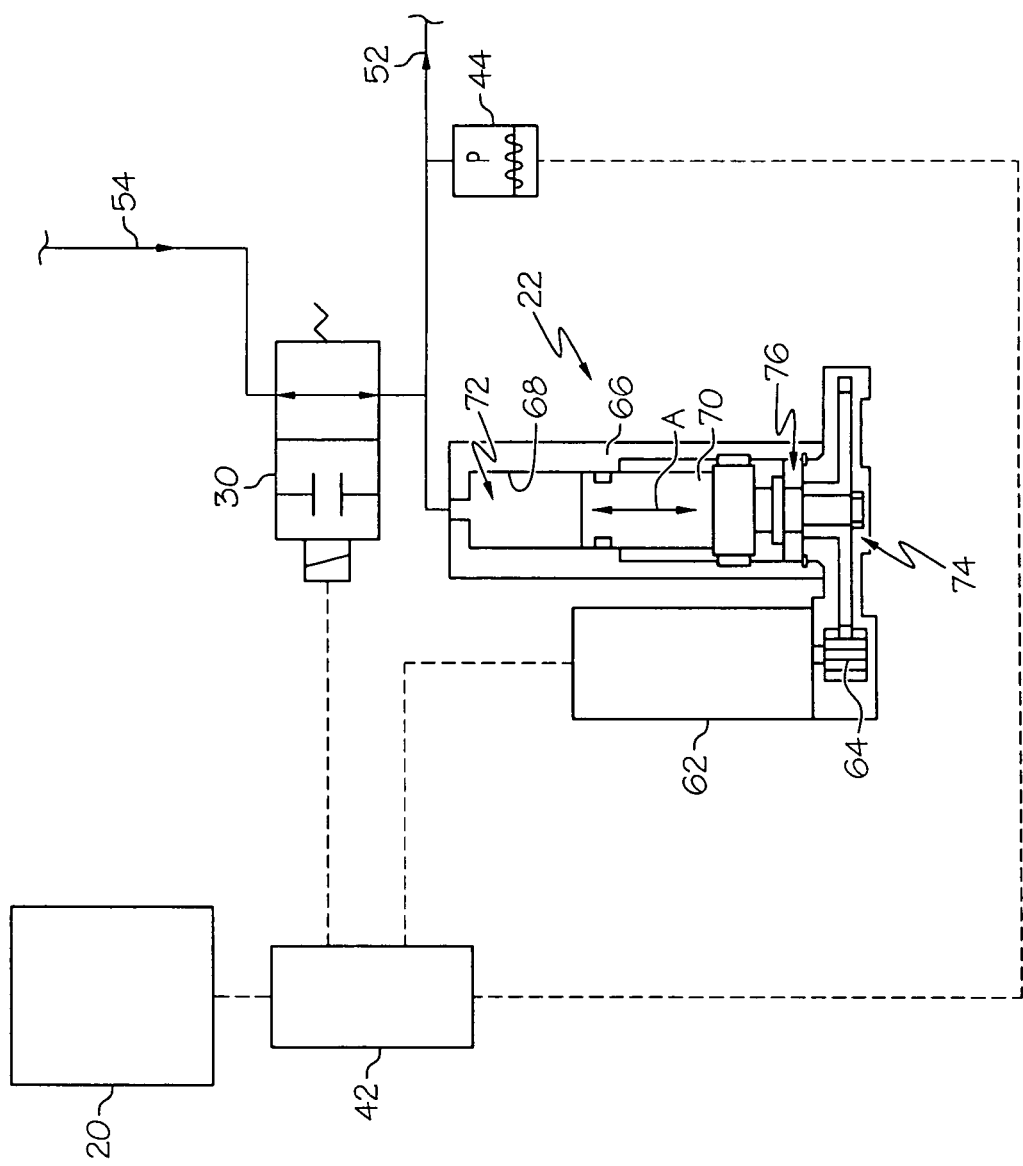
FIG. 2 is a partial schematic and partial sectional view of an electro-hydraulic brake actuator of the system of FIG. 1.

Referring to FIG. 2, the electro-hydraulic actuators 22, 24 (only unit 22 is shown in FIG. 2) may include a motor 62 (e.g., an electric motor) having a shaft 64 extending therefrom, an actuator housing 66 having a central bore 68 extending therethrough and a piston 70 closely and slidably received within the bore 68 to define a hydraulic fluid chamber 72 within the housing 66. A gear assembly 74 and a high efficiency screw 76 may be provided to translate rotational torque from the shaft 64 of the motor 62 into axial movement (see arrow A) of the piston 70 within in the bore 68. In addition, the motor 62 of the electro-hydraulic actuators 22, 24 may contain a mechanical or electro-mechanical brake mechanism (not shown) that can lock the shaft of the motor and thereby prevent unwanted back-driving of the gear and ball screw mechanisms even when the electrical signal is removed.

Accordingly, in response to a command from the control unit 42 (or the master control unit 20) the piston 70 may advance distally through the hydraulic fluid chamber 72 to urge hydraulic fluid out of the hydraulic fluid chamber 72 and into the fluid line 52, thereby increasing the fluid pressure in the fluid line 52 and actuating the brake calipers 48 (FIG. 1) to apply a braking force. Similarly, electro-hydraulic actuator 24 may independently actuate brake caliper 56 by increasing fluid pressure in corresponding fluid line 60. In one aspect, the control unit 42 may actuate (i.e., close) the normally open solenoid valves 30, 32 when the electro-hydraulic actuators 22, 24 are actuated to prevent hydraulic fluid from passing to fluid line 54.

Once the desired pressure in the fluid lines 52, 60 is reached, as determined by the wheel pressure sensors 44, 46, the control unit 42 may stop each of the motors 62 and corresponding advancement of the pistons 70. The braking force may be released by retracting the separate pistons 70 and/or opening the solenoid valves 30, 32 to depressurize the fluid lines 52, 60.

Figure 5:
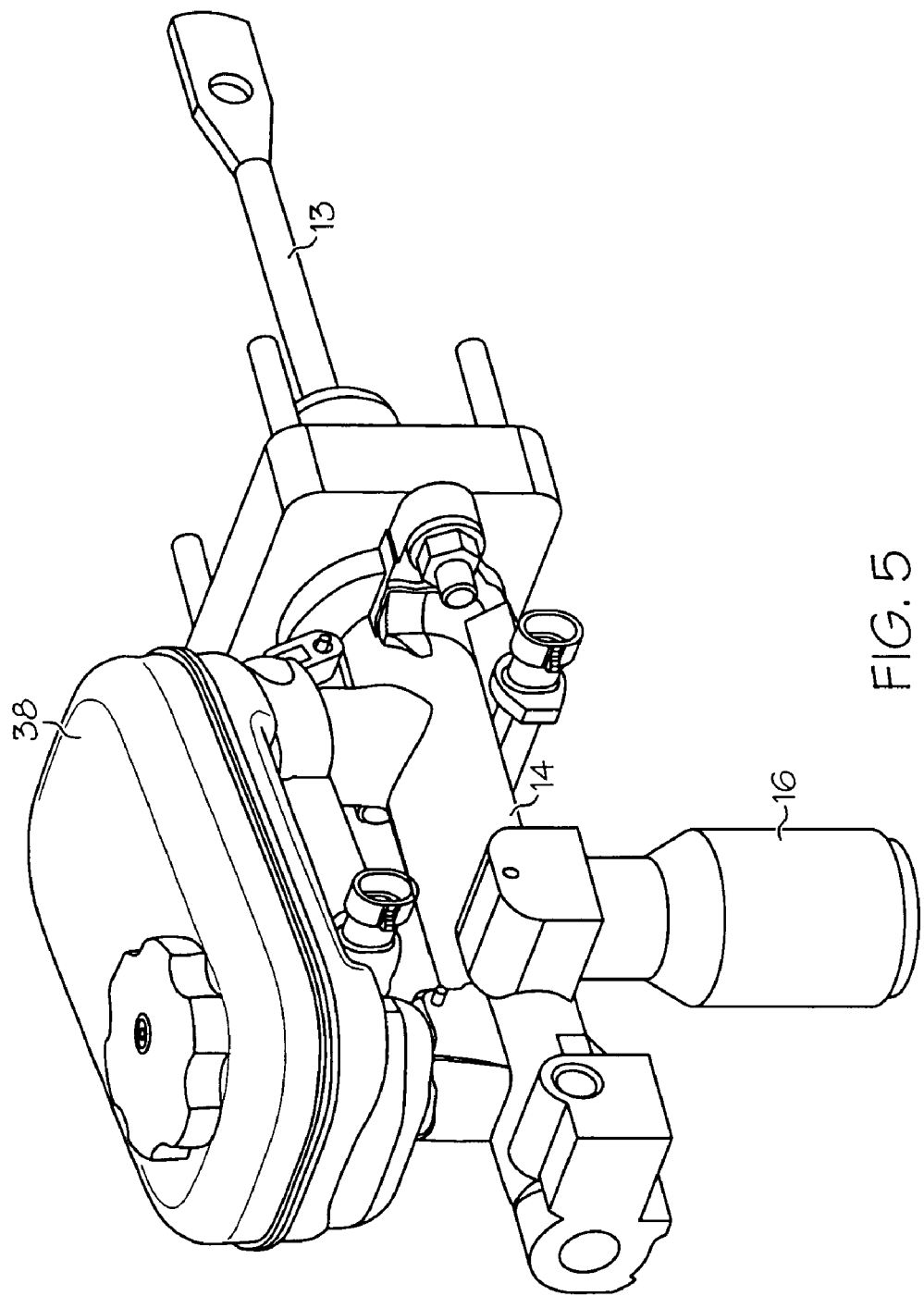
FIG. 5 is a perspective view of a master cylinder assembly of the system of FIG. 1 including the pedal feel emulator of FIG. 4.
Figure 6:
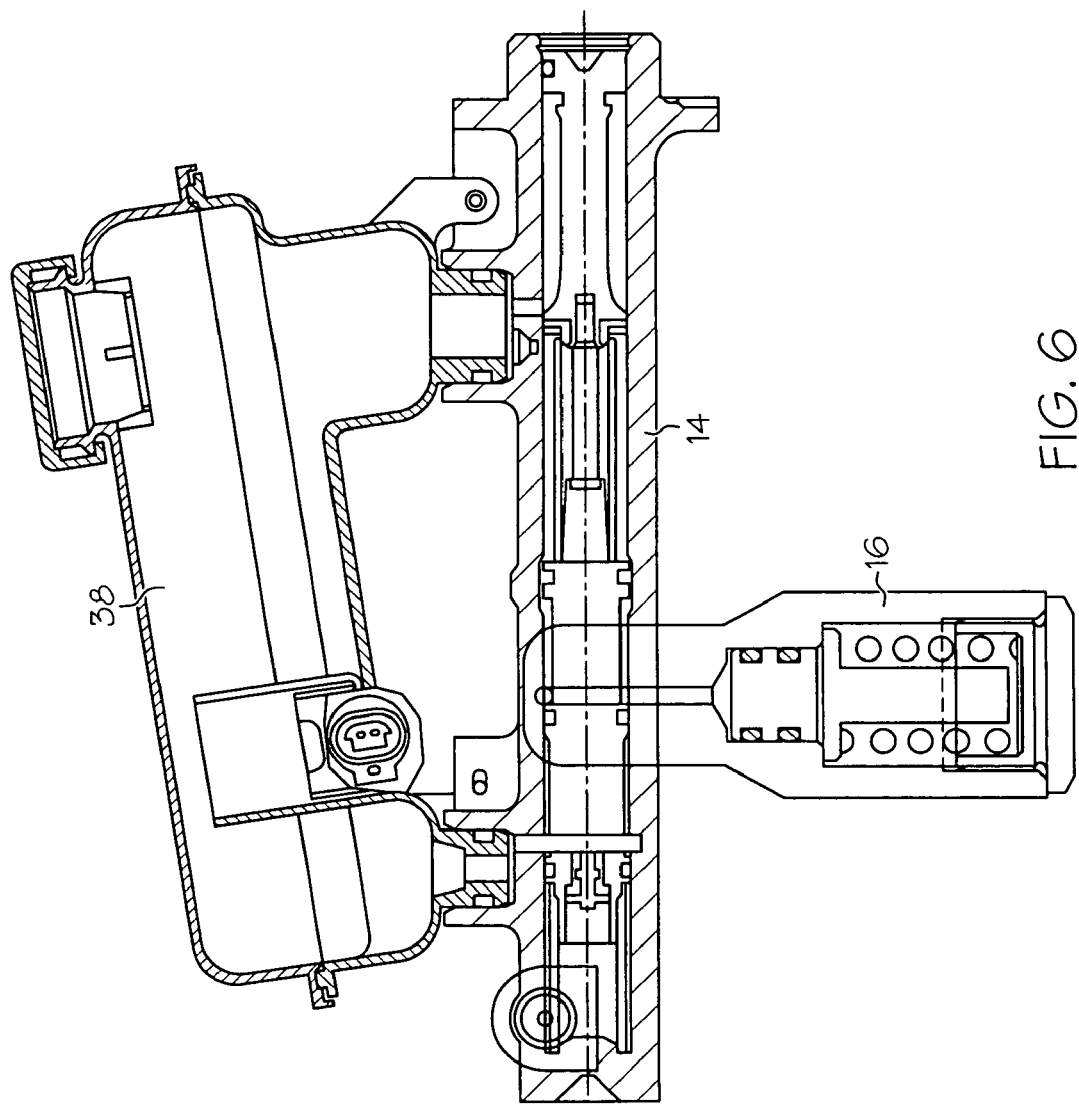
FIG. 6 is a front elevational view, in section of the master cylinder and pedal feel emulator assembly of FIG. 5.

While the two normally open solenoid valves 30, 32 are actuated (i.e., closed), hydraulic fluid may not pass from the master cylinder 14 to the fluid line 54 (i.e., there is no hydraulic connection between the master cylinder 14 and the brake units at the wheels 50, 58, 78, 80). Therefore, to permit rod 13 displacement through the master cylinder 14 (i.e., to simulate a traditional brake pedal movement), the hydraulic fluid may be urged out of the master cylinder, through the normally open hydraulically actuated bypass valve 18 and into the pedal feel emulator 16, as shown in FIGS. 1, 5 and 6.

Figure 4:
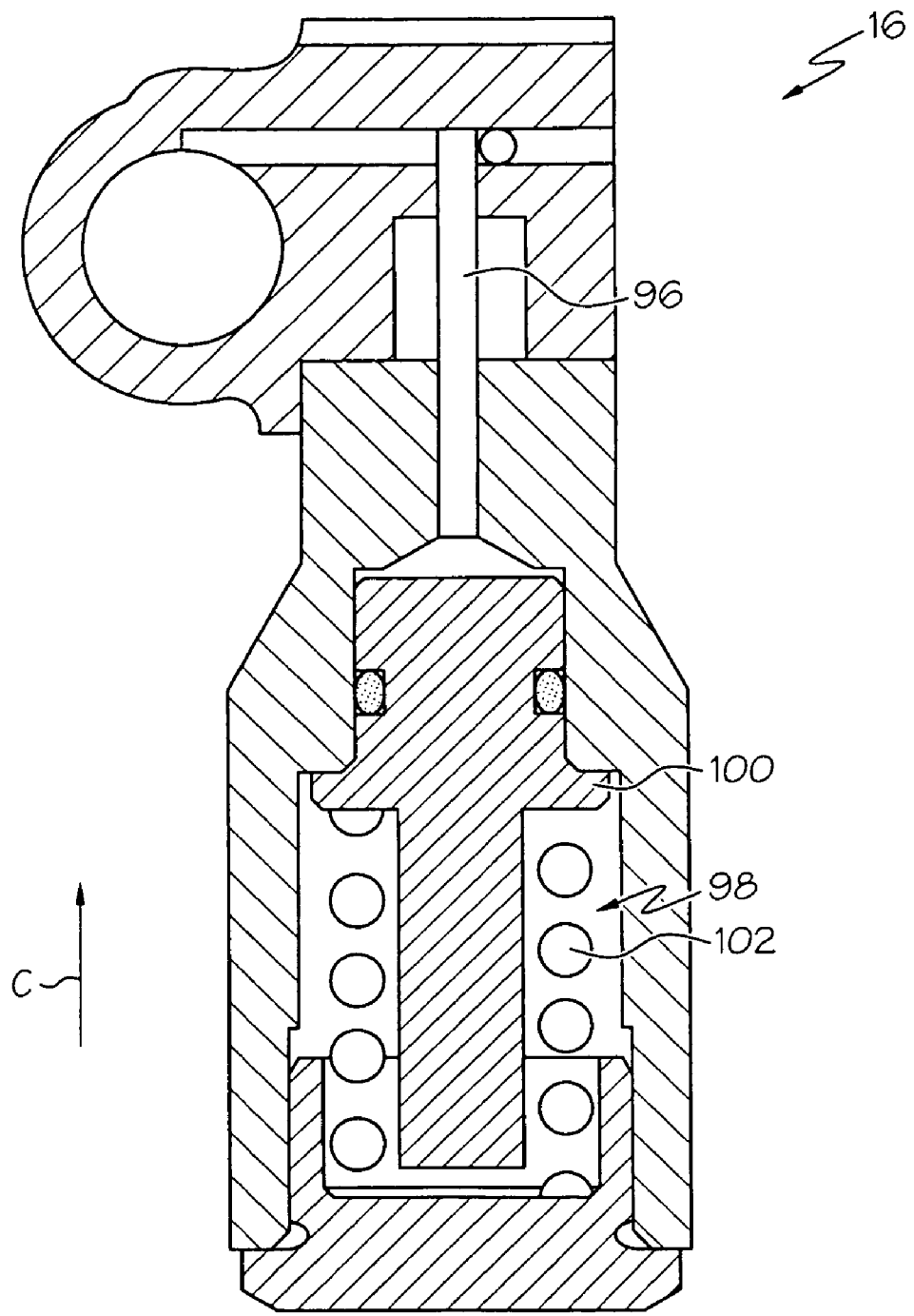
FIG. 4 is a front elevational view, in section, of a pedal feel emulator of the system of FIG. 1.

Referring to FIG. 4, the pedal feel emulator 16 may include a channel 96, a fluid accumulating chamber 98 in communication with the channel 96, a piston 100 closely and slidably received within the chamber 98 and a spring 102. The channel 96 may be in fluid communication with the master cylinder 14 by way of the normally open hydraulically actuated bypass valve 18 (FIG. 1). The spring 102 may be coaxially received over the piston 100 to urge the piston in the direction shown by arrow C and resist the introduction of hydraulic fluid into the chamber 98.

Referring again to FIG. 1, the first electro-mechanical brake caliper 26 may be associated with the right rear wheel 78 of the vehicle and the second electro-mechanical brake caliper 28 may be associated with the left rear wheel 80 of the vehicle. Each electro-mechanical brake caliper 26, 28 may include an electronic control unit 82, 84, which in turn may be in communication with the master control unit 20.

Figure 3:
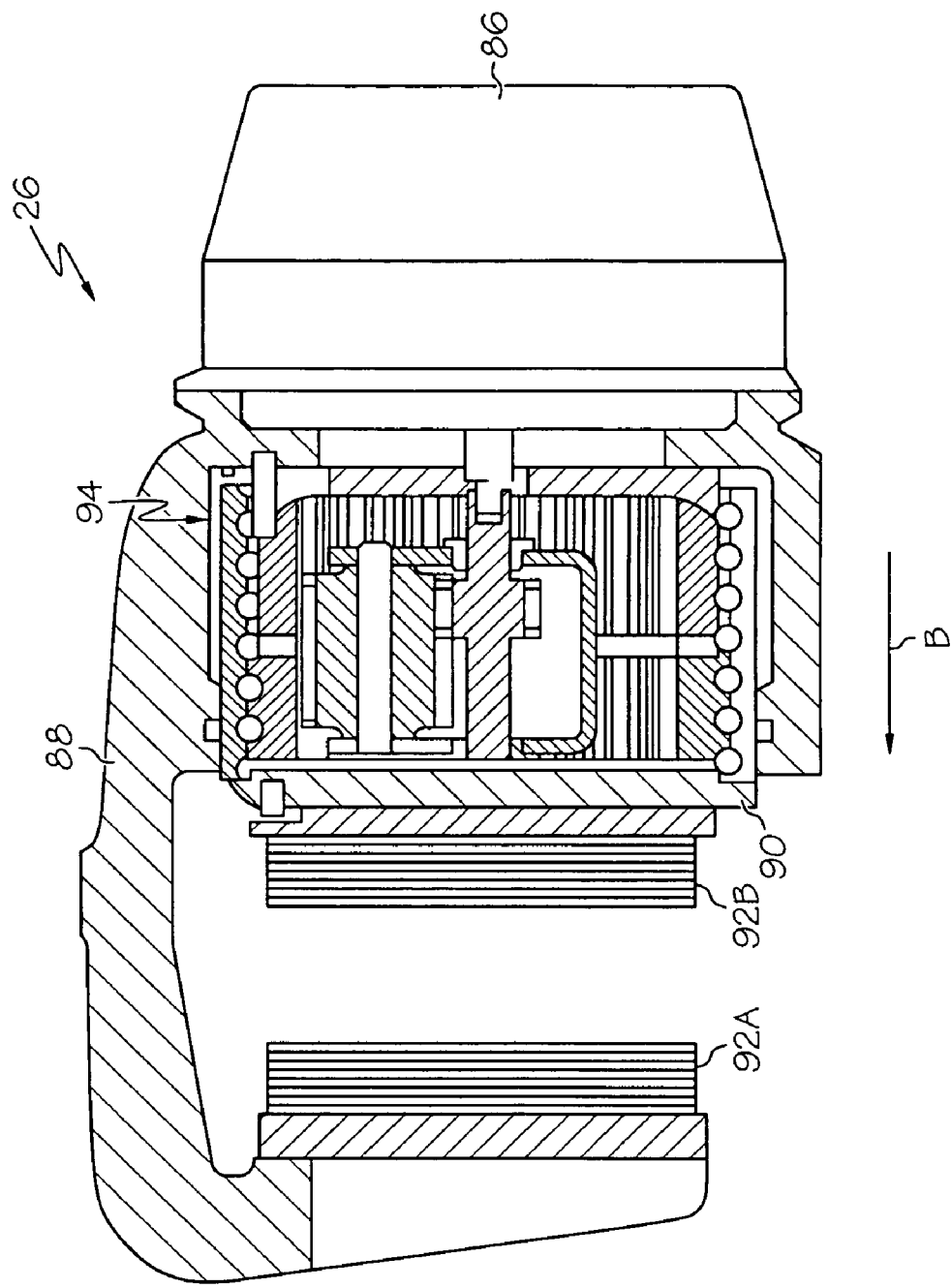
FIG. 3 is a front elevational view, in section, of an electro-mechanical brake caliper of the system of FIG. 1.

As shown in FIG. 3, the electro-mechanical brake calipers 26, 28 (only caliper 26 is shown in FIG. 3) may include a motor 86, a caliper housing 88, a piston 90, two brake pads 92A, 92B and a ball screw assembly 94. The ball screw assembly 94 may be positioned between the motor 86 and the piston 90 to translate rotational torque of the motor 86 into distal advancement of the piston 90. As the piston 90 advances distally (i.e., in the direction shown by arrow B), the piston may urge the brake pads 92A, 92B into engagement with an associated rotor (not shown), thereby clamping the rotor between the brake pads to apply a braking force. In addition, the electro-mechanical brake caliper may include a latching mechanism (not shown) that can be used to function as a parking brake device by prohibiting the motor and geartrain assembly from back-driving and thus maintain the full brake clamping force even when the electrical signal is removed.

Accordingly, in response to a command from the control units 82, 84 (or the master control unit 20), the motor 86 may be actuated to drive the piston 90 into engagement with the brake pads 92A, 92B. The braking force may be released by reversing the rotation of the motor and retracting the piston 90.

Thus, the system 10 may allow a user to apply a braking force to the wheels 50, 58, 78, 80 of a vehicle (not shown) by depressing the brake pedal 12. The movement of the pedal 12 may be detected by any combination of the brake pedal switch 34, the pedal travel sensor 36, and the master cylinder pressure sensor 40 and subsequently communicated to the master control unit.

In normal operation (i.e., not in fail-safe mode), when pedal movement is detected, the master control unit 20 may signal the two normally open solenoid valves 30, 32 to close, thereby preventing fluid flow in line 54. The locked fluid condition prevents movement of the master cylinder main piston (FIG. 6), which in turn keeps the seal of the hydraulically actuated bypass valve 18 in its normally open position of the bore undercut and causes trapped fluid in the opposite chamber to flow into the pedal feel emulator 16 through passageway 96. Then, based upon the inputs received by the master control unit 20, such as pedal travel (sensor 36), master cylinder pressure (sensor 40), wheel pressures (sensors 44, 46), vehicle speed, yaw rate, steering angle, lateral acceleration, longitudinal acceleration or any other appropriate signal, the master control unit 20 may actuate one or more of the electro-hydraulic actuators 22, 24 and/or one or more of the electro-mechanical brake calipers 26, 28 to generate a desired braking force and/or control the vehicle dynamics.

Alternatively, in the fail-safe mode (e.g., when an electrical failure has occurred), the two normally open solenoid valves 30, 32 remain open, thereby allowing hydraulic fluid displaced from the master cylinder 14 to pass directly to the brake calipers 48, 56 to apply a braking force (i.e., hydraulic braking) to the front wheels 50, 58. At the same time, since the master cylinder outlet port is no longer blocked shut, the main master cylinder piston is permitted to displace forward in the bore, allowing the seal of the normally open hydraulically actuated bypass valve 18 to slide past the bore undercut groove. The internal passageway is closed and any additional brake fluid is prevented from entering emulator 16.

Accordingly, in normal operation, the system 10 may operate as a full brake-by-wire braking system (i.e., no hydraulic or other mechanical connection between the master cylinder 14 and the brake units). In the fail-safe mode, the system 10 may have a direct hydraulic connection between the master cylinder 14 and at least one brake unit.

Those skilled in the art will appreciate that various arrangements of electro-hydraulic actuators and electro-mechanical brake calipers may be used. In one alternative aspect, the electro-hydraulic actuators may be positioned at the rear of the vehicle and the electro-mechanical brake calipers may be positioned at the front of the vehicle. In another alternative aspect, an electro-hydraulic actuator is associated with only one wheel of a vehicle. In another alternative aspect, electro-hydraulic actuators are associated with three or more wheels of a vehicle.

Although various aspects of the disclosed braking system have been shown and described, modifications may occur to those skilled in the art upon reading the specification. The present application includes such modifications and is limited only by the scope of the claims.

What is claimed is:

1. A brake-by-wire braking system for a vehicle having at least two wheels comprising:
   a control unit;
   an electro-mechanical brake caliper associated with a first one of said wheels, said electro-mechanical brake caliper being in communication with and actuateable by said control unit;
   a hydraulically actuated braking unit associated with a second one of said wheels;
   an electro-hydraulic actuator in fluid communication with said hydraulically actuated braking unit by way of a first fluid path, said electro-hydraulic actuator being in communication with and actuateable by said control unit;
   a master cylinder in fluid communication with said hydraulically actuated braking unit by way of a second fluid path, wherein said master cylinder is in selective fluid communication with a brake pedal feel emulator;
   a hydraulically actuated bypass valve operatively positioned between said master cylinder and said brake pedal feel emulator; and
   a normally open solenoid valve operatively associated with said second fluid path, said normally open solenoid valve being in communication with and actuateable by said control unit,
   wherein, when said electro-hydraulic actuator is actuated, said normally open solenoid valve is actuated.

2. The system of claim 1 wherein said electro-hydraulic actuator includes a hydraulic fluid chamber and an electric motor connected to a piston, said piston being moveable through said hydraulic fluid chamber in response to actuation of said electric motor, to displace a hydraulic fluid from said hydraulic fluid chamber.

3. The system of claim 2 wherein said displaced hydraulic fluid pressurizes said first fluid path.

4. The system of claim 1 wherein said hydraulically actuated braking unit is a brake caliper.

5. The system of claim 1 wherein said master cylinder is connected to a brake pedal.

6. The system of claim 1 wherein, when said normally open solenoid valve is actuated, hydraulic fluid displaced from said master cylinder is transferred to said brake pedal feel emulator.

7. The system of claim 1 wherein said brake pedal feel emulator includes a piston closely and slideably received within a bore, said piston being spring biased to resist introduction of hydraulic fluid into said bore.

8. The system of claim 1 wherein said electro-hydraulic actuator includes a motor having a motor shaft and a motor shaft brake adapted to selectively lock said motor shaft.

9. The system of claim 1 wherein said electro-mechanical brake caliper includes a motor, a ball screw assembly and a latching mechanism adapted to prohibit said motor and said ball screw assembly from back-driving.

* * * * *